(12) United States Patent
Snell

(10) Patent No.: US 11,293,554 B2
(45) Date of Patent: Apr. 5, 2022

(54) BACK TO BACK BEARING SEALING SYSTEMS

(71) Applicant: Johnson Controls Technology Company, Auburn Hills, MI (US)

(72) Inventor: Paul W. Snell, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 106 days.

(21) Appl. No.: 16/491,469

(22) PCT Filed: Mar. 8, 2018

(86) PCT No.: PCT/US2018/021586
§ 371 (c)(1),
(2) Date: Sep. 5, 2019

(87) PCT Pub. No.: WO2018/165455
PCT Pub. Date: Sep. 13, 2018

(65) Prior Publication Data
US 2020/0224771 A1 Jul. 16, 2020

Related U.S. Application Data

(60) Provisional application No. 62/469,422, filed on Mar. 9, 2017.

(51) Int. Cl.
*F16J 15/46* (2006.01)
*F16J 15/447* (2006.01)
(Continued)

(52) U.S. Cl.
CPC ......... *F16J 15/4472* (2013.01); *F16J 15/164* (2013.01); *F05D 2240/55* (2013.01);
(Continued)

(58) Field of Classification Search
CPC ...... F16J 15/4472; F16J 15/164; F16J 15/002; F16J 15/3224; F05D 2240/55; F16C 33/805
See application file for complete search history.

(56) References Cited

U.S. PATENT DOCUMENTS 2,186,537 A 1/1940 Salisbury
3,306,620 A 2/1967 Taschenberg
(Continued)

FOREIGN PATENT DOCUMENTS

CN 201071799 Y 6/2008
CN 102162528 A 8/2011
(Continued)

OTHER PUBLICATIONS

Chinese Office Action for GN Application No. 201880025546.9, dated Jan. 6, 2021, 15 pgs.
(Continued)

*Primary Examiner* — Gilbert Y Lee
(74) *Attorney, Agent, or Firm* — Fletcher Yoder, P.C.

(57) ABSTRACT

Embodiments of the present disclosure are directed toward a sealing system for a motor that includes a first sealing element configured to be circumferentially disposed around a rotor shaft of the motor. The sealing system also includes a second sealing element configured to be circumferentially disposed around the rotor shaft. A sealing tip of the first sealing element is configured to lift from a surface of the rotor shaft in response to a pressurized fluid directed between the first sealing element and the second sealing element. Additionally, the first sealing element and the second sealing element are configured to radially float around the rotor shaft.

20 Claims, 8 Drawing Sheets

(51) Int. Cl.
*F16J 15/16* (2006.01)
*F16C 33/80* (2006.01)
*F16J 15/00* (2006.01)
*F16J 15/3224* (2016.01)

(52) U.S. Cl.
CPC .......... *F16C 33/805* (2013.01); *F16J 15/002* (2013.01); *F16J 15/3224* (2013.01)

(56) References Cited

U.S. PATENT DOCUMENTS

| | | | |
|---|---|---|---|
| 3,575,426 A | | 4/1971 | Durham |
| 3,726,531 A | | 4/1973 | Pagan et al. |
| 4,448,425 A | * | 5/1984 | von Bergen ......... B63H 23/321 |
| | | | 277/320 |
| 4,534,569 A | * | 8/1985 | Ishitani ............... B63H 23/321 |
| | | | 277/351 |
| 5,553,870 A | | 9/1996 | Czekansky et al. |
| 5,564,896 A | | 10/1996 | Beeck et al. |
| 5,575,617 A | | 11/1996 | Marmilic et al. |
| 5,577,887 A | | 11/1996 | Gouyon et al. |
| 5,961,124 A | | 10/1999 | Muller |
| 6,095,780 A | * | 8/2000 | Ernens ................... F16J 15/002 |
| | | | 418/104 |
| 6,241,252 B1 | | 6/2001 | Jump et al. |
| 6,247,702 B1 | | 6/2001 | Long et al. |
| 6,290,234 B1 | | 9/2001 | Eberle et al. |
| 6,471,211 B1 | | 10/2002 | Garnett et al. |
| 6,485,279 B2 | | 11/2002 | Zhong et al. |
| 6,623,238 B2 | | 9/2003 | Langston et al. |
| 6,843,313 B2 | | 1/2005 | Hult |
| 6,971,277 B2 | | 12/2005 | Schlenker |
| 7,044,217 B2 | | 5/2006 | Hult |
| 7,066,467 B2 | | 6/2006 | Sakata |
| 7,703,427 B2 | | 4/2010 | Schafer et al. |
| 8,251,371 B2 | | 8/2012 | Gaebler |
| 8,317,479 B2 | | 11/2012 | Vronsky et al. |
| 8,349,054 B2 | | 1/2013 | Fredenhagen et al. |
| 9,022,760 B2 | | 5/2015 | Bakkestuen et al. |
| 9,101,884 B2 | | 8/2015 | Brown |
| 9,115,646 B2 | | 8/2015 | Patterson et al. |
| 9,140,305 B2 | | 9/2015 | Gulli |
| 9,279,493 B2 | | 3/2016 | Inotsuka |
| 2005/0152780 A1 | | 7/2005 | Quill et al. |
| 2006/0208427 A1 | | 9/2006 | Wright et al. |
| 2008/0274001 A1 | | 11/2008 | Okamoto et al. |
| 2009/0226124 A1 | | 9/2009 | Nakagawa et al. |
| 2011/0198887 A1 | | 8/2011 | Rabhi |
| 2011/0223010 A1 | | 9/2011 | Mundinger et al. |
| 2012/0001395 A1 | | 1/2012 | Kurth et al. |
| 2014/0054092 A1 | | 2/2014 | Buckman, Sr. |
| 2014/0333031 A1 | | 11/2014 | Tones et al. |
| 2014/0369873 A1 | | 12/2014 | Bassine |
| 2015/0230445 A1 | | 8/2015 | Fotland |
| 2015/0260187 A1 | | 9/2015 | Endo et al. |
| 2015/0276059 A1 | | 10/2015 | Nakagawa |
| 2016/0040544 A1 | | 2/2016 | Desjardins |
| 2016/0091023 A1 | | 3/2016 | Shiono et al. |
| 2016/0131150 A1 | | 5/2016 | Oda et al. |
| 2016/0365769 A1 | | 12/2016 | Raczek et al. |

FOREIGN PATENT DOCUMENTS

| | | |
|---|---|---|
| CN | 104279331 A | 1/2015 |
| CN | 104411922 A | 3/2015 |
| EP | 0643223 B1 | 3/1995 |
| EP | 0899182 B1 | 3/2002 |
| EP | 0769111 B1 | 8/2002 |
| EP | 0859154 B1 | 11/2002 |
| EP | 0913583 B1 | 1/2004 |
| EP | 0993553 B1 | 6/2004 |
| EP | 1394451 B1 | 1/2007 |
| EP | 1701018 B1 | 11/2007 |
| EP | 1929189 B9 | 6/2008 |
| EP | 1662141 B1 | 10/2008 |
| EP | 1764512 B1 | 4/2010 |
| EP | 2376777 A2 | 10/2011 |
| EP | 2526288 A2 | 11/2012 |
| EP | 2297451 B1 | 1/2013 |
| EP | 2596568 B1 | 10/2014 |
| EP | 2948423 A1 | 12/2015 |
| EP | 2992199 A1 | 3/2016 |
| EP | 3058147 A1 | 8/2016 |
| EP | 3102310 A1 | 12/2016 |
| FR | 2765653 A1 | 1/1999 |
| FR | 2914384 A1 | 10/2008 |
| GB | 906366 A | 9/1962 |
| JP | S63312569 A | 12/1988 |
| JP | 2004245267 A | 9/2004 |
| WO | 20010155593 A1 | 8/2001 |
| WO | 2004015288 A1 | 2/2004 |
| WO | 2007096736 A1 | 8/2007 |
| WO | 2014172189 A1 | 10/2014 |
| WO | 2016080956 A1 | 5/2016 |
| WO | 2016095982 A1 | 6/2016 |

OTHER PUBLICATIONS

Korean Office Action for KR Application No. 10-2019-7029310, dated Jan. 25, 2021, 10 pgs.
Chinese Office Action for CN Application No. 201880025546.9, dated May 7, 2020, 13 pgs.
PCT/US2018/021586 International Search Report dated May 24, 2018.
European Office Action for EP Application No. 18711802.1, dated Nov. 9, 2021, 8 pgs.
Korean Office Action for KR Application No. 10-2019-7029310, dated Dec. 20, 2021, 4 pgs.

* cited by examiner

BACK TO BACK BEARING SEALING SYSTEMS

CROSS-REFERENCE TO RELATED APPLICATION

This application is a Non-Provisional application claiming priority to U.S. Provisional Application No. 62/469,422, entitled "BACK TO BACK BEARING SEALS," filed Mar. 9, 2017, which is hereby incorporated by reference in its entirety for all purposes.

BACKGROUND

This application relates generally to vapor compression systems incorporated in air conditioning and refrigeration applications, and, more particularly, to a sealing system for a motor of a compressor.

Vapor compression systems are utilized in residential, commercial, and industrial environments to control environmental properties, such as temperature and humidity, for occupants of the respective environments. The vapor compression system circulates a working fluid, typically referred to as a refrigerant, which changes phases between vapor, liquid, and combinations thereof in response to being subjected to different temperatures and pressures associated with operation of the vapor compression system. For example, the vapor compression system utilizes a compressor to circulate the refrigerant to a heat exchanger which may transfer heat between the refrigerant and another fluid flowing through the heat exchanger. A motor that powers the compressor includes rotating components supported by bearings that may be lubricated by oil or another suitable lubricant. Unfortunately, the oil may escape from the bearings over time, contaminating other components of the vapor compression system with oil and reducing the lubrication of the bearings.

SUMMARY

In one embodiment, a sealing system for a motor includes a first sealing element configured to be circumferentially disposed around a rotor shaft of the motor. The sealing system also includes a second sealing element configured to be circumferentially disposed around the rotor shaft. A sealing tip of the first sealing element is configured to lift from a surface of the rotor shaft in response to a pressurized fluid directed between the first sealing element and the second sealing element. Additionally, the first sealing element and the second sealing element are configured to radially float around the rotor shaft.

In another embodiment, a sealing system for a motor of a compressor includes a first sealing element configured to be circumferentially disposed around a rotor shaft of the motor within an annular chamber of a motor housing. The sealing system also includes a second sealing element configured to be circumferentially disposed around the rotor shaft within the annular chamber. The first sealing element and the second sealing element are configured to radially float around the rotor shaft. Moreover, the sealing system includes a spring element disposed axially between the first sealing element and the second sealing element. The spring element is configured to bias the first sealing element against a first wall of the annular chamber to adjust an axial position of the first sealing element and the second sealing element within the annular chamber.

In another embodiment, a motor for a compressor includes a housing and a rotor shaft extending within the housing. The motor includes a first sealing element circumferentially disposed around the rotor shaft. Additionally, the motor includes a second sealing element circumferentially disposed around the rotor shaft. A sealing tip of the first sealing element is configured to lift from a surface of the rotor shaft in response to a pressurized fluid directed between the first sealing element and the second sealing element. Moreover, the first sealing element and the second sealing element are configured to radially float around the rotor shaft.

Other features and advantages of the present application will be apparent from the following, more detailed description of the embodiments, taken in conjunction with the accompanying drawings which illustrate, by way of example, the principles of the application.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed toward a heating, ventilating, air conditioning, and refrigeration (HVAC&R) system that uses a motor to drive or power a compressor that circulates refrigerant through a refrigerant circuit. The motor may include a rotor shaft supported by a bearing assembly within a motor housing. By rotating the rotor shaft, the motor enables a rotor of the compressor that is coupled to the rotor shaft to rotate and compress refrigerant within the refrigerant circuit. The compressor may compress the refrigerant to increase a pressure of the refrigerant and direct the refrigerant to a heat exchanger, such as a condenser, downstream of the compressor along the refrigerant circuit. To enable the rotor shaft to rotate relative to the motor housing, the bearing assembly is disposed around longitudinal ends of the rotor shaft. Additionally, lubricating oil or another suitable lubricant is applied to or injected onto the bearing assembly, thereby reducing friction between rotating components of the compressor. To maintain the oil within the bearing assembly, a sealing system may be disposed around the rotor shaft. However, because the rotor shaft may generate excessive friction against certain types of sealing elements, certain existing sealing systems may wear prematurely, thus leading to frequent and expensive replacement. Additionally, the existing sealing systems may include statically-mounted components having small machining tolerances that cause interference between components of the motor if the components or the sealing system are manufactured outside the tolerances or experience wear that causes the components or the sealing system to be outside of the tolerances. Accordingly, it is now recognized that including a sealing system having selectively liftable and/or radially-adjustable sealing elements as well as longitudinally-adjustable components may improving a sealing capacity, operational efficiency, and operating lifetime of the HVAC&R system.

Figure 1:
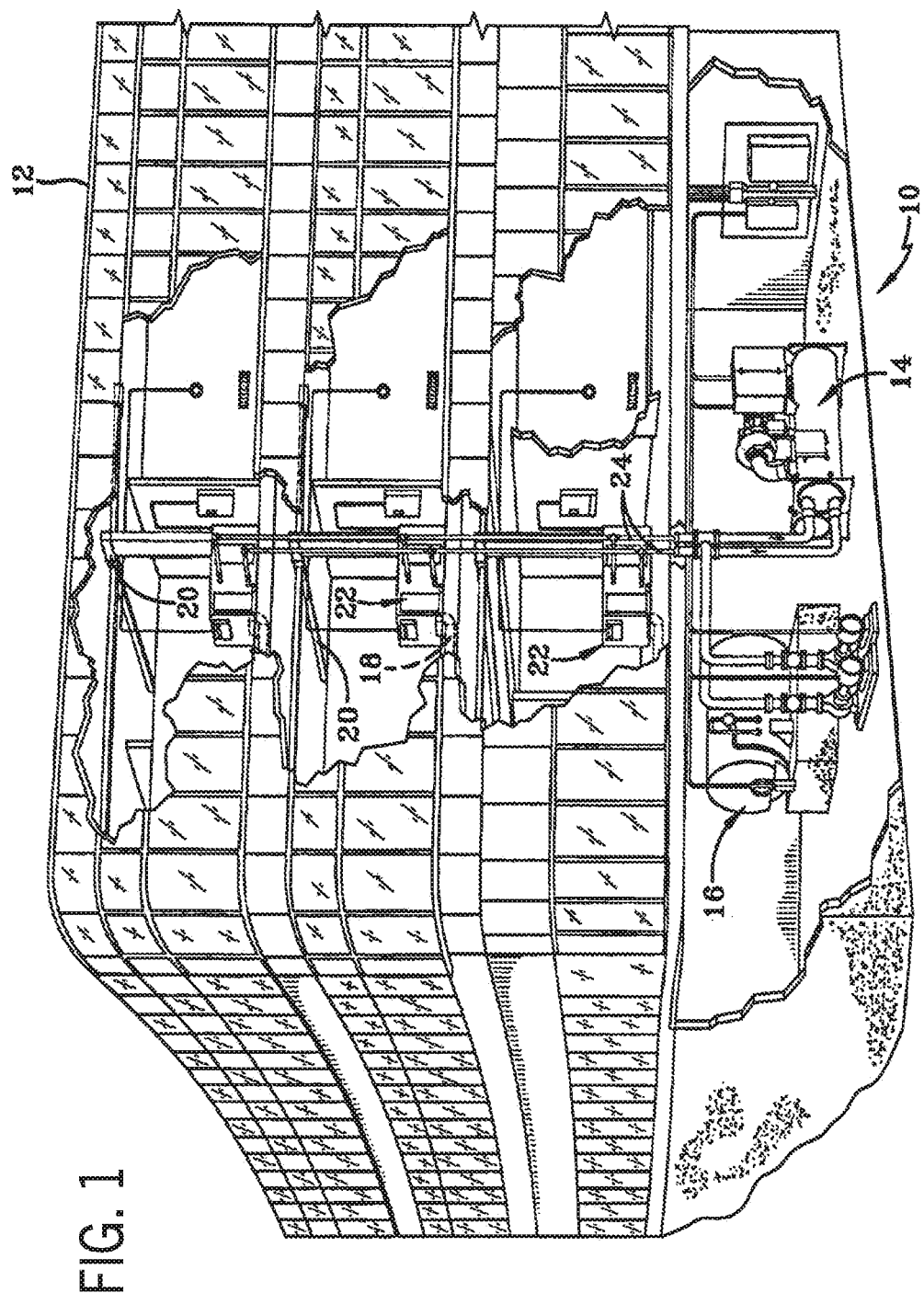
FIG. 1 is a perspective view of an embodiment of a building that may utilize a heating, ventilation, air conditioning, and refrigeration (HVAC&R) system in a commercial setting, in accordance with an aspect of the present disclosure.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
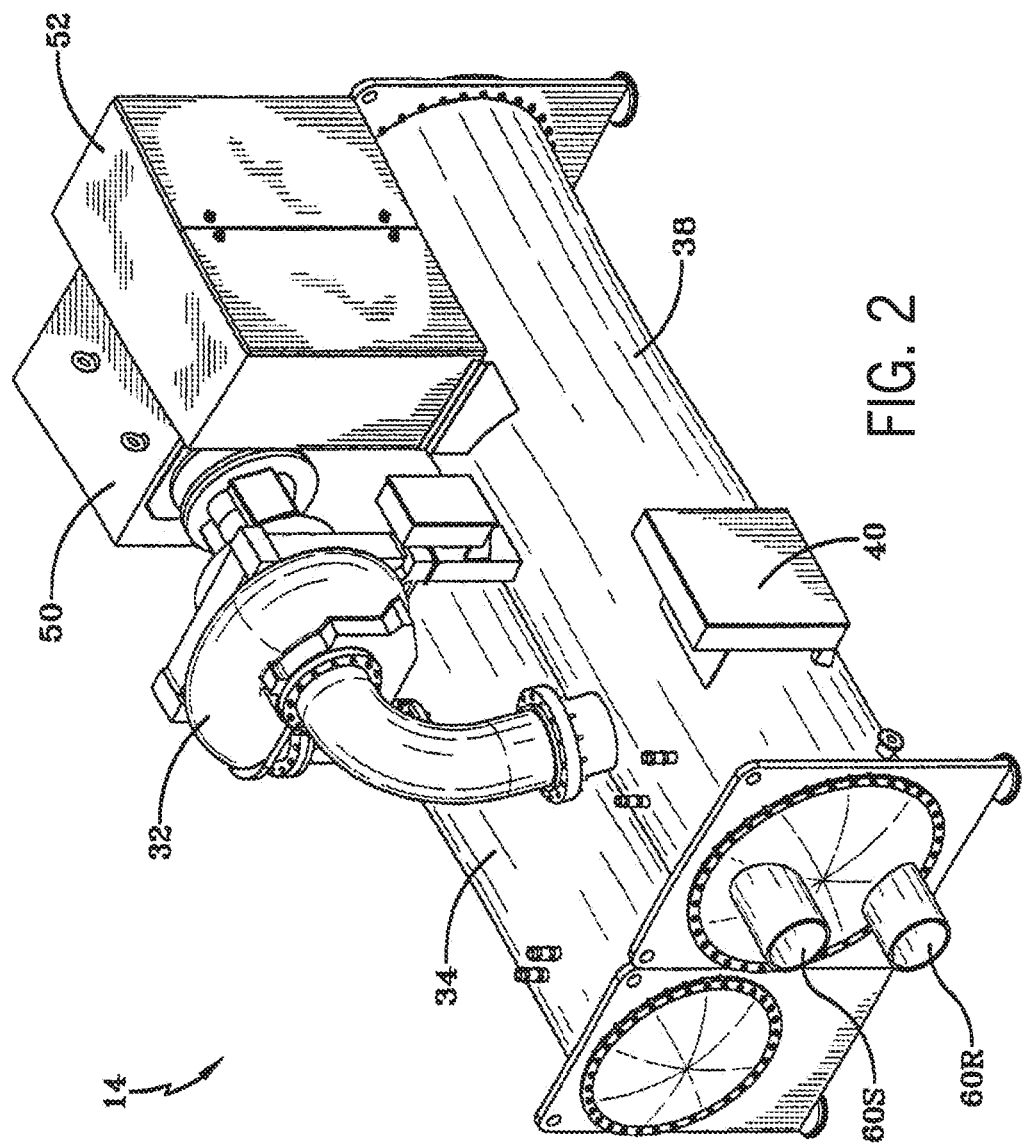
FIG. 2 is a perspective view of a vapor compression system, in accordance with an aspect of the present disclosure.
Figure 3:
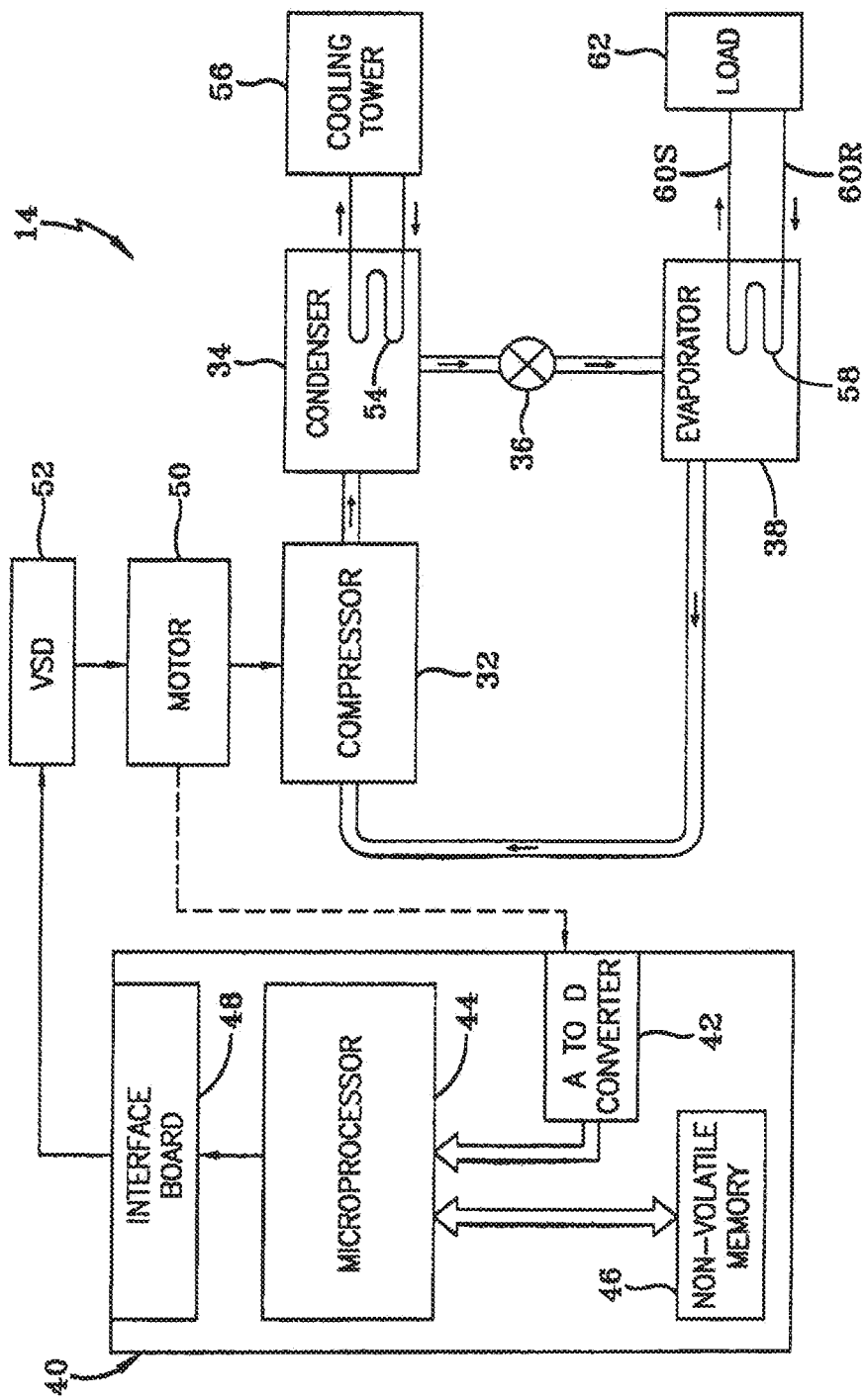
FIG. 3 is a schematic of an embodiment of the vapor compression system of FIG. 2, in accordance with an aspect of the present disclosure.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The liquid refrigerant from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser.

The liquid refrigerant delivered to the evaporator 38 may absorb heat from another cooling fluid, which may or may not be the same cooling fluid used in the condenser 34. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

Figure 4:
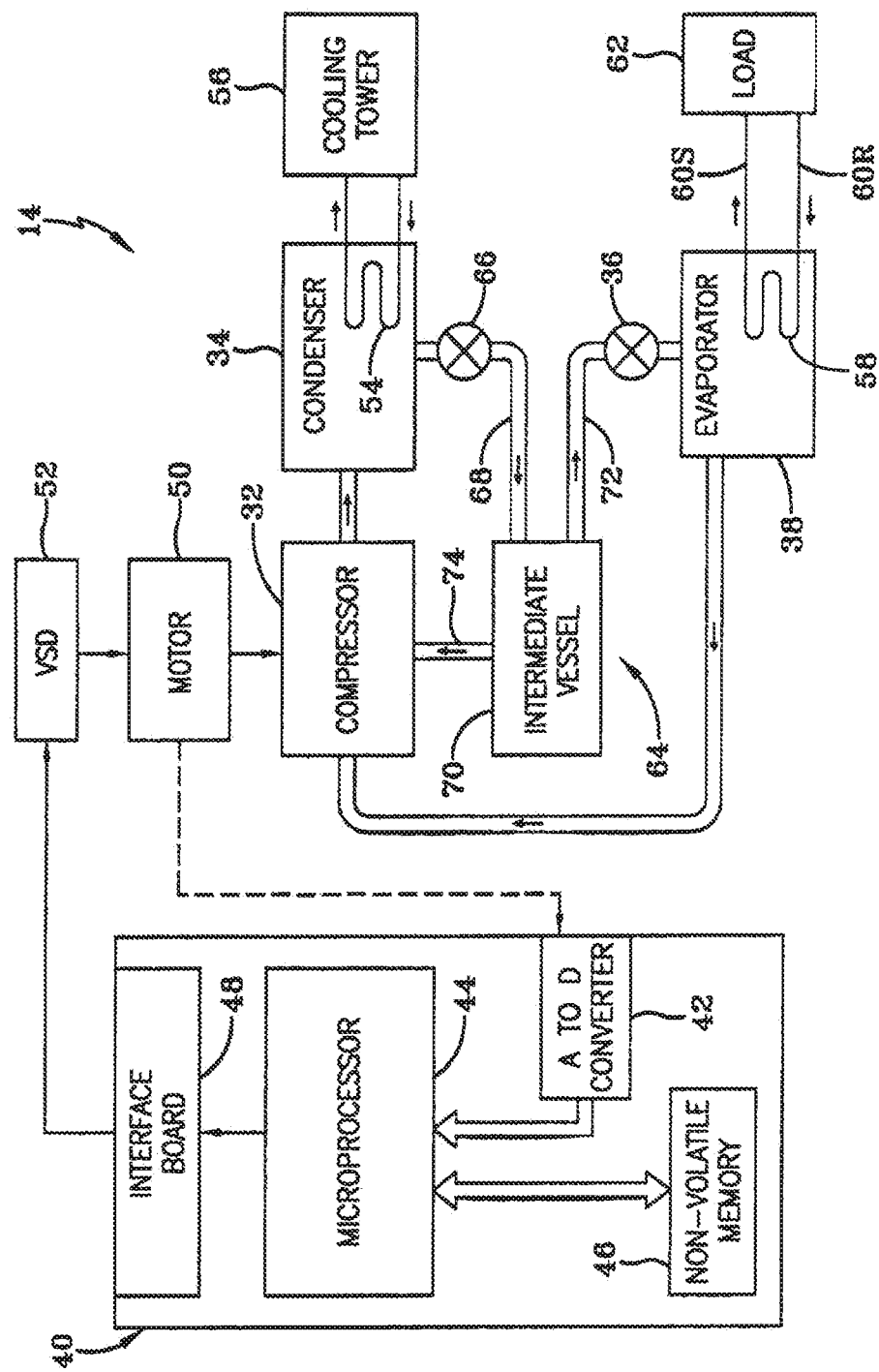
FIG. 4 is a schematic of an embodiment of the vapor compression system of FIG. 2, in accordance with an aspect of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the liquid refrigerant received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the liquid refrigerant because of a pressure drop experienced by the liquid refrigerant when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the liquid refrigerant exiting the condenser 34 because of the expansion in the expansion device 66 and/or the intermediate vessel 70. The liquid from intermediate vessel 70 may then flow in line 72 through a second expansion device 36 to the evaporator 38.

Figure 5:
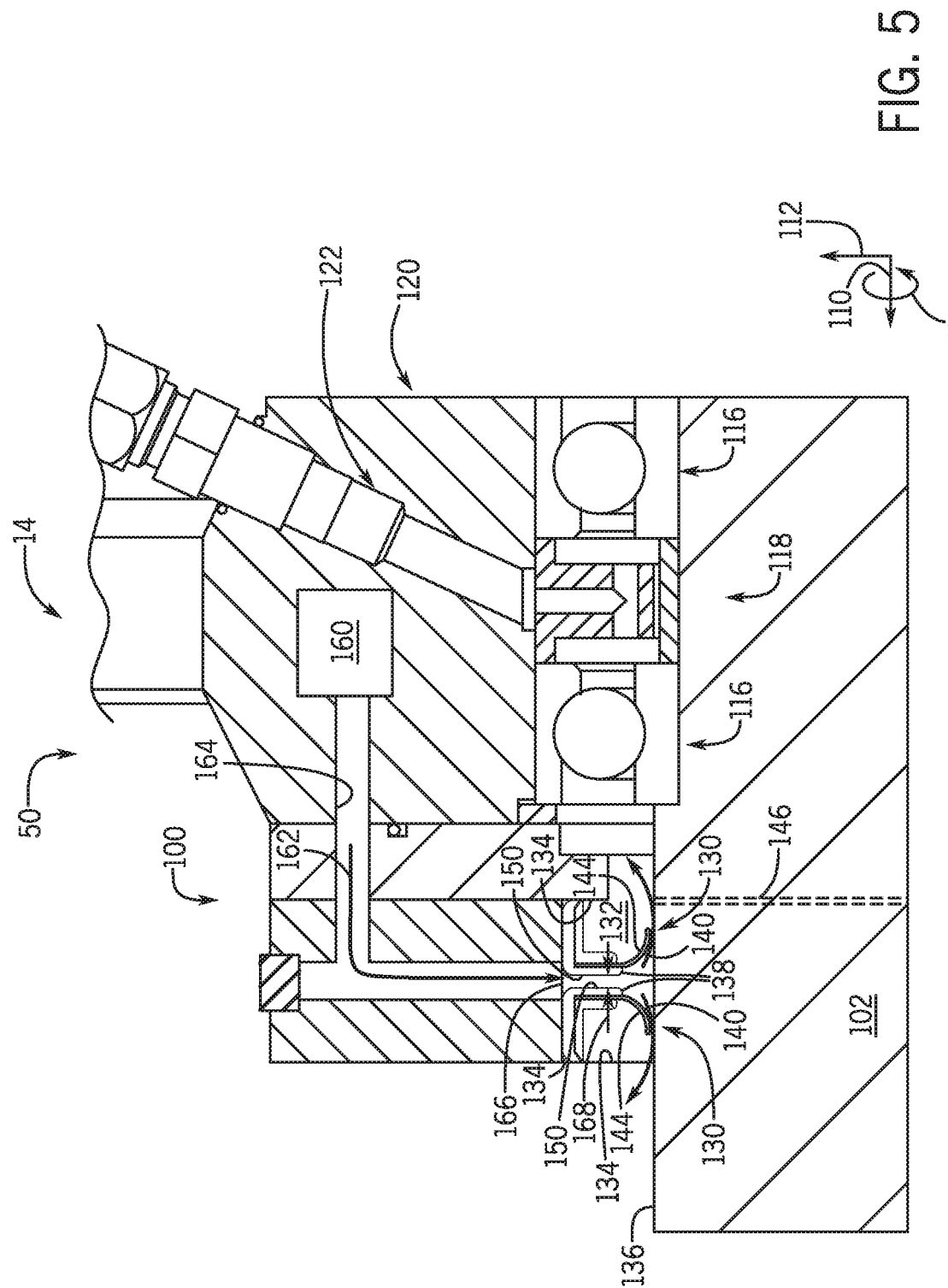
FIG. 5 is a cross-sectional side view of an embodiment of a sealing system for a motor of the vapor compression system of FIG. 2 having back to back lip seals, in accordance with an aspect of the present disclosure.

As noted above, motors having rotating components, such as the motor 50 for the compressor 32, may utilize sealing systems to block or eliminate oil leakage from bearing assemblies of the rotating components. For example, FIG. 5 is a cross-sectional side view of a sealing system 100 for the motor 50 of the vapor compression system 14. In the present embodiment, the motor 50 includes a rotor shaft 102 that may drive the compressor 32, although any other suitable motor or shaft for any suitable component may employ the sealing system 100 disclosed herein. Further, although described with reference to one bearing assembly 118, it is to be understood that the sealing system 100 may be utilized for each suitable bearing assembly of the vapor compression system 14, including those supporting each rotor included within the compressor 32.

As illustrated, the rotor shaft 102 is a cylindrical component having a length extending along a longitudinal axis 110, a radius extending along a radial axis 112, and a circumference extending along a circumferential axis 114. Moreover, a bearing assembly 118 of the motor 50 includes ball bearings 116 circumferentially disposed around the rotor shaft 102. The bearing assembly 118 enables the rotor shaft 102 to rotate about the longitudinal axis 110 relative to a motor housing 120 or stator to perform work, such as compressing the refrigerant or another suitable working fluid. In other embodiments, any other suitable bearings, such as sleeve bearings, roller bearings, and so forth may be used within the bearing assembly 118 of the motor 50. To lubricate rotation between components of the motor 50, an oil injector 122 or any other suitable lubricating system may supply oil or lubricant to the ball bearings 116.

In the present embodiment, the sealing system 100 includes two lip seals 130 or sealing elements disposed within an annular chamber 132 defined between walls 134 or inner housing walls of the motor housing 120 and an outer surface 136 of the rotor shaft 102. Each lip seal 130 includes an L-shaped retainer ring 138 having an L-shaped cross-section formed of a rigid material, such as stainless steel or machined aluminum. Each lip seal 130 also includes a sealing portion 140 or sealing member retained or captured within one of the L-shaped retainer rings 138. Additionally, each sealing portion 140 may be formed of a flexible material, such as polytetrafluoroethylene (PTFE), rubber, or another suitable material that enables each sealing portion 140 to be biased against the outer surface 136 of the rotor shaft 102. As such, when the rotor shaft 102 is at rest or still, sealing tips 144 of the sealing portions 140 apply force to the rotor shaft 102, thus blocking oil from escaping from the bearing assembly 118. Thus, in certain instances, oil may move away from the bearing assembly 118 along the longitudinal axis 110, but the sealing system 100 directs the oil to an oil drain 146 that extends from the annular chamber 132, through the motor housing 120, and back to an oil reservoir or other suitable location. Further, the lip seals 130 of the sealing system 100 are arranged with respective back surfaces 150 facing one another, such that the lip seals 130 are arranged as back to back lip seals.

Additionally, the sealing system 100 includes a pressurized fluid source 160 that is capable of directing a pressurized fluid 162 between the back surfaces 150 of the lip seals 130. The pressurized fluid source 160 may include a high-pressure or discharge portion of the compressor 32, an external pressurized fluid source, such as a canister, or any other suitable source of fluid that is pressurized relative to a pressure of the annular chamber 132. In the present embodiment, the pressurized fluid 162 travels through an injection pathway 164 defined or machined into the motor housing 120. The injection pathway 164 may extend between the pressurized fluid source 160 and the annular chamber 132, such as along the longitudinal axis 110 and then radially inward along the radial axis 112. In the present embodiment, one or more apertures 166 or holes are defined between the lip seals 130, which are spaced from one another by a gap or space 168. Therefore, the pressurized fluid 162 may pass through the apertures 166 between the lip seals 130 to pressurize the space 168 between the lip seals 130, such that a sufficient pressure that lifts one or both of the lip seals 130 may be selectively applied to the lip seals 130. As such, the sealing system 100 may apply the pressurized fluid 162 to the lip seals 130 to selectively lift the lip seals 130 from contact with the rotor shaft 102. Indeed, because the lip seals 130 may lift away from the outer surface 136 of the rotor shaft 102 in response to the pressurized fluid 162, each lip seal 130 may be considered a "reverse" lip seal, in contrast to traditional lip seals that may seal more tightly against a rotor shaft in response to application of a pressurized fluid.

During operation of the compressor 32, the rotor shaft 102 may rotate at various rotation rates or speeds along the circumferential axis 114 and relative to the motor housing 120 to power or drive a rotor of the compressor 32 of FIG. 2. For example, based on control signals received from the control panel 40 or another suitable control device, the motor 50 may ramp up a rotation rate of the rotor shaft 102 from a resting state corresponding to 0 revolutions per minute (RPM) to an activated state corresponding to approximately 500 RPM, 1000 RPM, 1500 RPM, 2000 RPM, and so forth. To operate the sealing system 100 during rotation rates above a threshold rotation rate, the pressurized fluid 162 may be selectively directed through the injection pathway 164 to lift the lip seals 130 off of the rotating rotor shaft 102. After lifting the lip seals 130, the pressurized fluid 162 may proceed to provide a force along the longitudinal axis 110 on oil from the bearing assembly 118 to motivate the oil back toward the bearing assembly 118 and/or through the oil drain 146. Accordingly, the sealing system 100 may employ reverse back to back lip seals 130 to block, reduce, or eliminate oil leakage from the bearing assembly 118 during rest states, offline states, and low rotation rates of the motor 50, and the sealing system 100 may employ the pressurized fluid 162 to block, reduce, or eliminate oil leakage during higher rotational rates of the rotor shaft 102 of the motor 50.

Figure 6:
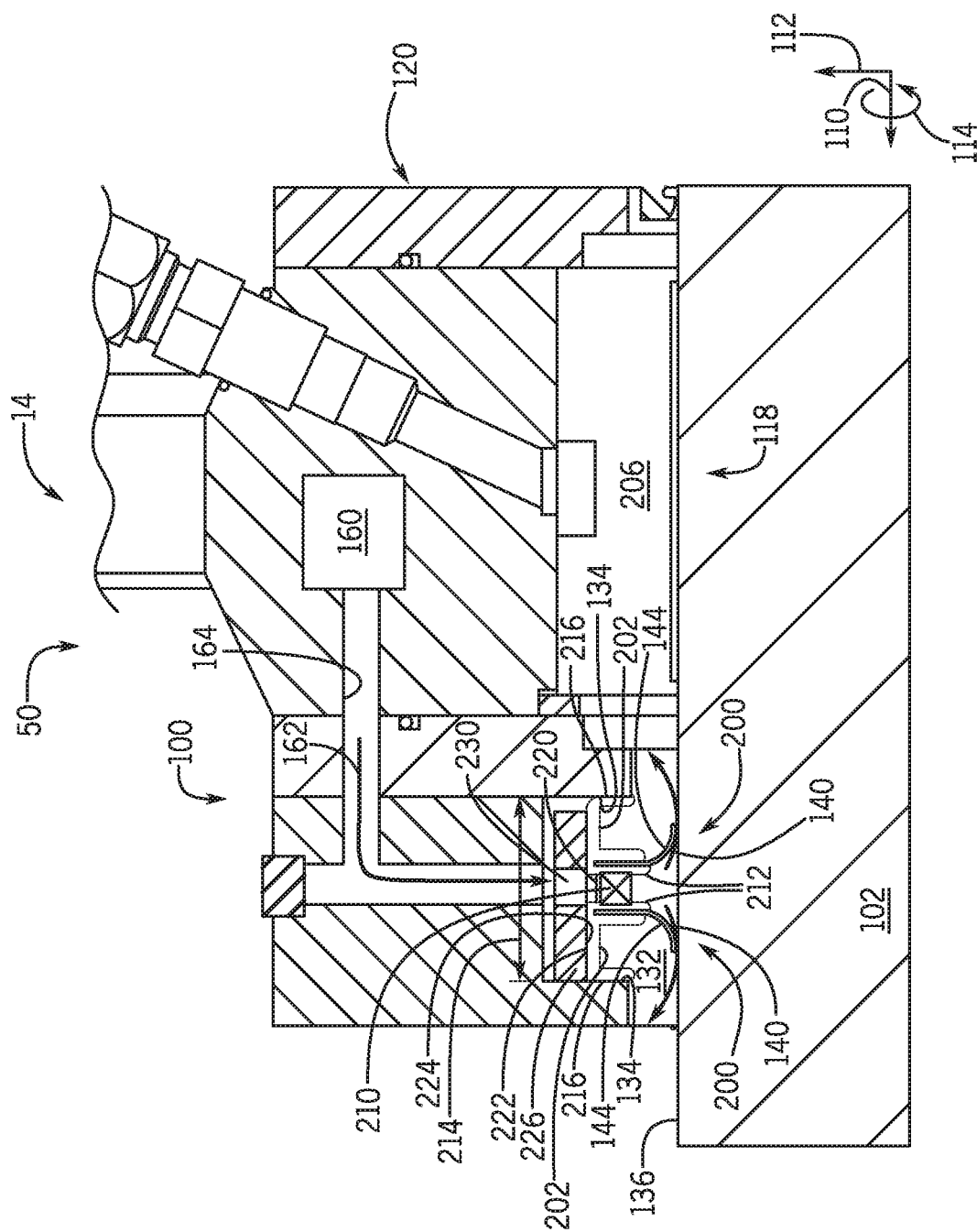
FIG. 6 is a cross-sectional side view of an embodiment of the sealing system for the motor of FIG. 2 having back to back lip seals with radial float, in accordance with an aspect of the present disclosure.

FIG. 6 is a cross-sectional side view of an embodiment of the sealing system 100 that may radially float within the annular chamber 132 around the rotor shaft 102. As illustrated, the sealing system 100 of FIG. 6 includes two floating lip seals 200 in a back to back arrangement. The floating lip seals 200 generally correspond to the lip seals 130 of FIG. 5; however, each floating lip seal 200 in the illustrated embodiment includes a U-shaped retaining ring 202 or clip for holding the sealing portion 140 of the floating lip seal 200 instead of the L-shaped retaining ring 138 of FIG. 5. The floating lip seals 200 are also arranged as reverse back to back lip seals, such that the respective sealing tips 144 of the floating lip seals 200 are biased against the outer surface 136 of the rotor shaft 102 in opposite directions from one another. The bearing assembly 118 of the motor 50 of the present embodiment includes a sleeve bearing 206 for enabling rotation of the rotor shaft 102 relative to the motor housing 120. However, any suitable bearings for any suitable rotating element may be sealed with the sealing system 100. For example, in some embodiments, the rotor shaft 102 of the motor 50 may be supported by ball bearings or roller bearings instead of the illustrated sleeve bearing 206.

As illustrated, the floating lip seals 200 may be coupled to each other indirectly, such as by a spring 210 or spring element disposed between axial-facing surfaces 212 of the respective U-shaped retaining ring 202 of each floating lip seal 200. For the embodied separation distance between the floating lip seals 200, the spring 210 is designed to apply a force or bias to both floating lip seals 200 to cause the floating lip seals 200 to move away from one another to fill a longitudinal length 214 of the annular chamber 132. An axial-facing surface 216 of each floating lip seal 200 may therefore maintain contact with the walls 134 of the annular chamber 132. Therefore, the spring 210 enables the sealing system 100 to adapt an axial position of each floating lip seal 200 to various longitudinal lengths of various annular chambers, thereby reducing a demand for identical clearances to be machined within the motor housing 120 and for the components of the sealing system 100. Moreover, to block or eliminate pivoting of the floating lip seals 200 relative to one another, an anti-rotation pin 220 may be disposed or coupled between the floating lip seals 200. As such, force applied to one floating lip seal 200 by the spring 210 or the rotor shaft 102 may not cause the one floating lip seal to rotate or pivot relative to the second floating lip seal 200. In some embodiments, multiple anti-rotation pins 220 are disposed at various circumferential locations between the floating lip seals 200 to further block or eliminate rotation or pivoting between the floating lip seals 200.

Additionally, each floating lip seal 200 includes a radially outward surface 222 disposed against a radially inward surface 224 of a guide ring 226. The guide ring 226 may enable the floating lip seals 200 to dynamically adjust their radial position along the radial axis 112 relative to the rotor shaft 102. Therefore, the floating lip seals 200 may maintain soft contact with the rotor shaft 102, or contact that may improve a part life of the sealing portions 140, which reduces friction between the floating lip seals 200 and the rotor shaft 102 while blocking oil leakage from the bearing assembly 118. For example, due to the flexible nature of the floating lip seals 200, the rotor shaft 102 may return a force that the floating lip seals 200 apply to the rotor shaft 102, thereby causing the floating lip seals 200 to press against the guide ring 226. Then, the guide ring 226 may adjust the radial position of floating lip seals 200 relative to the rotor shaft 102 to more evenly distribute the force along a circumference of the guide ring 226. The guide ring 226 may be made of any suitable rigid material, such as stainless steel or machined aluminum, such that motion of the guide ring 226 in a radially outward direction on one side of the rotor shaft 102 causes an opposed section of the guide ring 226 to move radially inward.

The guide ring 226 includes an aperture 230 therethrough to enable the pressurized fluid source 160 to selectively direct the pressurized fluid 162 between the floating lip seals 200, such as described above with reference to FIG. 5. As such, at off-states or low operating speeds of the motor 50, the floating lip seals 200 may maintain contact with the outer surface 136 of the rotor shaft 102. Then, at higher operating speeds, the pressurized fluid 162 may be directed through the injection pathway 164 to lift the sealing portions 140 of the floating lip seals 200 off of the rotor shaft 102. In some embodiments, the sealing system 100 may be inserted within the annular chamber 132 as a cartridge, kit, or pre-assembled system having the floating lip seals 200, the spring 210, the anti-rotation pin 220, and the guide ring 226 to facilitate or improve an assembly process of the motor 50 compared to sealing systems that are assembled piece by piece within the motor housing 120. Indeed, the sealing system 100 of FIG. 6 may include longitudinal float relative to the rotor shaft 102 accorded by the spring 210 during assembly, and the sealing system 100 may include radial float relative to the rotor shaft 102 accorded by the guide ring 226.

Figure 7:
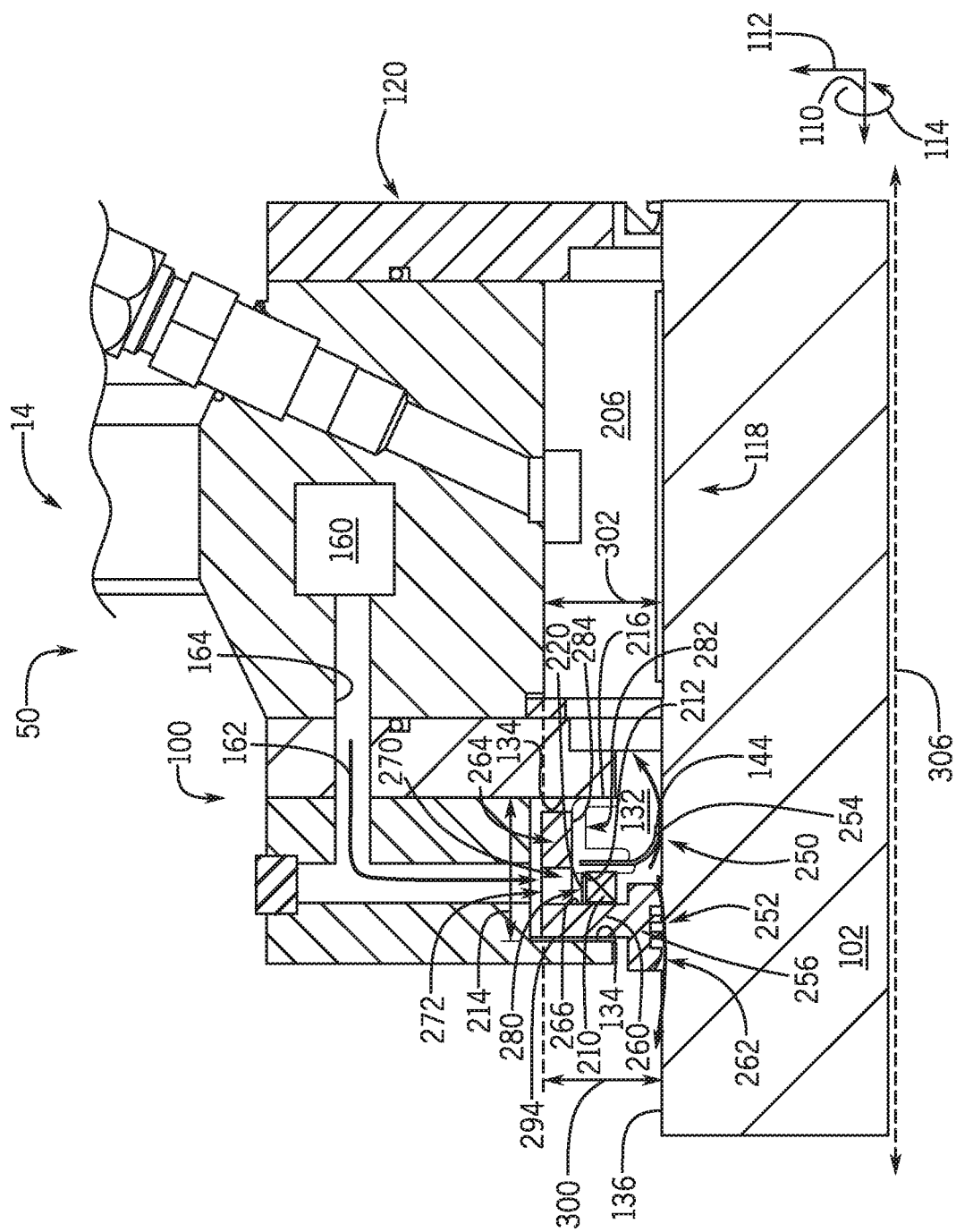
FIG. 7 is a cross-sectional side view of an embodiment of the sealing system for the motor of FIG. 2 having back to back lip and labyrinth seals with radial float, in accordance with an aspect of the present disclosure.

FIG. 7 is a cross-sectional side view of an embodiment of the sealing system 100 having mixed sealing elements that may radially float around the rotor shaft 102. That is, the sealing system 100 includes a first sealing element 250 and a second sealing element 252 that are adjustable about the rotor shaft 102 along the radial axis 112 within the annular chamber 132 of the motor housing 120. The motor 50 of the present embodiment includes the bearing assembly 118 having the sleeve bearing 206 described above with reference to FIG. 6. As illustrated, the first sealing element 250 includes a floating lip seal 254 and the second sealing element 252 includes a labyrinth seal 256. The floating lip seal 254 may be generally similar to one of the floating lip seals 200 described above that have the U-shaped retaining ring 202 holding the sealing portion 140 therein. That is, the floating lip seal 254 may be biased against the outer surface 136 of the rotor shaft 102 so that the floating lip seal 254 in a normal or resting state is in contact with the outer surface 136 of the rotor shaft 102. Additionally, the floating lip seal 254 may include the axial-facing surface 212 that faces the labyrinth seal 256.

As described herein, the labyrinth seal 256 includes a sealing extension 260 that has a T-shaped cross-section with a toothed surface 262 for blocking or eliminating oil leakage from the bearing assembly 118. The toothed surface 262 may include a raised spiral element, equally-sized raised ridge elements, or any other suitable surface features for providing a tortuous path that slows or blocks traversal of fluid underneath the labyrinth seal 256. Additionally, the labyrinth seal 256 includes an axial extension 264 that protrudes from an axial-facing surface 266 of the sealing extension 260. The sealing extension 260, the axial extension 264, or both, may be formed from any suitable rigid material, such as stainless steel, machined aluminum, or a material from which the bearing assembly 118 is formed. As illustrated, a hole or aperture 270 is formed through a center portion 272 of the axial extension 264. The sealing system 100 may therefore direct the pressurized fluid 162 along the injection pathway 164 and through the aperture 270 to pressurize a space 280 between the floating lip seal 254 and the labyrinth seal 256. In some embodiments, additional apertures are spaced along a circumference of the axial extension 264 of the labyrinth seal 256, thus enabling the pressurized fluid 162 to traverse the labyrinth seal 256 at more circumferential positions, instead of relying on pressurizing the space 280 between the floating lip seal 254 and the labyrinth seal 256 via the pressurized fluid 162 directed through one aperture. Additionally, although discussed herein with reference to the labyrinth seal 256, it is to be understood that any other suitable zero contact or negligible contact seals may be employed within the sealing system 100 according to the present techniques.

In the present embodiment, the floating lip seal 254 is positioned within a receiving space 282 defined between a radially inward surface 284 of the axial extension 264 and the outer surface 136 of the rotor shaft 102. The floating lip seal 254 may be indirectly coupled to the labyrinth seal 256 by the spring 210 disposed between the axial-facing surface 266 of the sealing extension 260 of the labyrinth seal 256 and the axial-facing surface 212 of the floating lip seal 254. As described above with reference to FIG. 6, the spring 210 may apply a force to both the floating lip seal 254 and the labyrinth seal 256 to cause the floating lip seal 254 and the labyrinth seal 256 to bias away from one another to fill the longitudinal length 214 of the annular chamber 132. An axial-facing surface 294 of the labyrinth seal 256 may maintain contact with one wall 134 of the annular chamber 132, while the axial-facing surface 216 of the floating lip seal 254 may maintain contact with an opposed wall 134 of the annular chamber 132. The sealing system 100 may also include the anti-rotation pin 220 coupled between the floating lip seal 254 and the labyrinth seal 256 to block or eliminate rotation therebetween.

As such, during off periods or resting states of the motor 50, the floating lip seal 254 contacts the outer surface 136 of the rotor shaft 102 to block oil leakage from the bearing assembly 118. In some embodiments, the labyrinth seal 256 may have a radial length 300 that is smaller than a resting height 302 of the floating lip seal 254 and the axial extension 264 during the off periods. As such, the labyrinth seal 256 may be minutely separated from the outer surface 136 of the rotor shaft 102. When the motor 50 is operating and the rotor shaft 102 is rotating, the pressurized fluid source 160 may direct the pressurized fluid 162 through the injection pathway 164, into the aperture 270, and within the space 280 between the floating lip seal 254 and the labyrinth seal 256. As such, the force from the pressurized fluid 162 may lift the sealing tip 144 of the floating lip seal 254 from the outer surface 136 of the rotor shaft 102.

In such a situation, the labyrinth seal 256 may also receive a portion of the pressurized fluid 162. For example, the pressurized fluid 162 may form a barrier between the toothed surface 262 of the sealing extension 260 of the labyrinth seal 256. Importantly, the labyrinth seal 256 may guide radial float of the sealing system 100 disposed around the rotor shaft 102. For example, under conditions in which the rotor shaft 102 is vibrating or moving relative to the motor housing 120, one end or side of the rotor shaft 102 may move closer to the motor housing 120 than an opposed end or an opposed side. Additionally, under conditions in which the outer surface 136 of the rotor shaft 102 includes an irregular or non-perfect cross-section, a first side of the outer surface 136 of the rotor shaft 102 may protrude further from a longitudinal centerline 306 of the rotor shaft 102 than a second side of the outer surface 126, opposed from the first side. To guide radial float of the sealing system 100, the sealing system 100 may dynamically move along the radial axis 112 to adapt for any movement and/or shaping of the rotor shaft 102. For example, the toothed surface 262 may move up or down along the radial axis 112 to maintain a desired separation distance from the rotor shaft 102. The desired separation distance may be constructed differently for each application of the sealing system 100 based on the particular motor 50 and the individual components used within the motor 50 and the sealing system 100.

Figure 8:
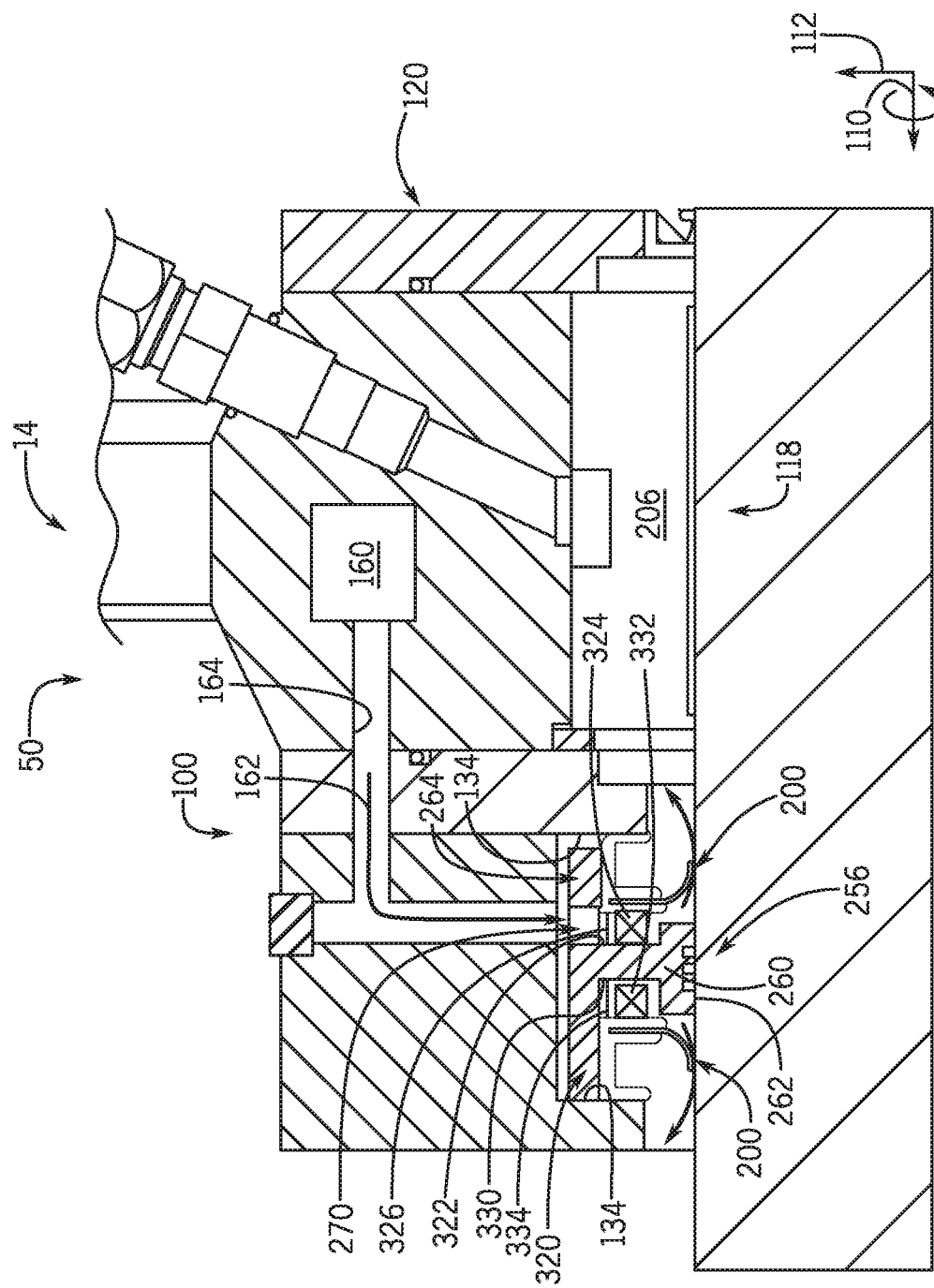
FIG. 8 is a cross-sectional side view of an embodiment of the sealing system for the motor of FIG. 2 having back to back lip seals with a labyrinth seal for guiding radial float, in accordance with an aspect of the present disclosure.

FIG. 8 is a cross-sectional side view of an embodiment of the sealing system 100 that includes the labyrinth seal 256 to guide radial float of the back to back floating lip seals 200. For example, the sealing system 100 of FIG. 8 may combine certain features of the embodiment of FIG. 6 with certain features of the embodiment of FIG. 7. As illustrated, the labyrinth seal 256 includes the sealing extension 260 having the T-shaped cross-section and the toothed surface 262 described above. In addition to the axial extension 264 with the aperture 270 therethrough, the labyrinth seal 256 of FIG. 8 also includes an additional axial extension 320 extending along the longitudinal axis 110 in a direction opposite of the axial extension 264. Therefore, each floating lip seal 200 may be supported and radially guided by the axial extensions 264, 320 of the labyrinth seal 256. In some embodiments, the additional axial extension 320 may include an aperture for receiving the pressurized fluid 162 in addition or in alternative to the illustrated aperture 270 of the axial extension 264.

Moreover, one floating lip seal 200 may be coupled to a first axial surface 322 of the sealing extension 260 of the labyrinth seal 256 by a first spring 324 and a first anti-rotation pin 326, while the other floating lip seal 200 may be coupled to a second axial surface 330 of the sealing extension 260 of the labyrinth seal 256 by a second spring 332 and a second anti-rotation pin 334. Therefore, the sealing system 100 may be dynamically fit within the annular chamber 132 of the motor housing 120 by expanding to seal against the walls 134 of the annular chamber 132. In other embodiments, the labyrinth seal 256 for guiding the radial position of the sealing system 100 may be positioned at a lateral end of the floating lip seals 200 instead of between the floating lip seals 200. Additionally, the second spring 332 and the second anti-rotation pin 334 may be omitted in some embodiments having the second floating lip seal 200 directly coupled to the second axial surface 330 of the labyrinth seal 256. Further, the labyrinth seal 256 having the axial extensions 264, 320 may be employed to support other sealing members than the lip seals discussed herein.

As set forth above, the present disclosure may provide one or more technical effects useful in the sealing a bearing assembly of a rotating component for an HVAC&R system. Embodiments of the disclosure may include sealing elements that are selectively liftable from a rotor shaft of the rotating component in response to a pressurized fluid from a pressurized fluid source. Additionally, the sealing elements may be radially adjustable relative to the rotor shaft, thus enabling continuously variable adjustment of the sealing elements relative to the rotor shaft. In this manner, oil leaking or spreading from the bearing assembly is directed back to the bearing assembly or an oil drain by the sealing elements and/or the pressurized fluid. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A sealing system for a motor, comprising:
a first sealing element configured to be circumferentially disposed around a rotor shaft of the motor;
a second sealing element configured to be circumferentially disposed around the rotor shaft, wherein a sealing tip of the first sealing element is configured to lift from a surface of the rotor shaft in response to a pressurized fluid directed between the first sealing element and the second sealing element, and wherein the first sealing element and the second sealing element are configured to radially float around the rotor shaft; and
a spring coupled axially between the first sealing element and the second sealing element, wherein the spring is configured to bias the first sealing element against a first inner housing wall of the motor and to bias the second sealing element against a second inner housing wall of the motor, opposite of the first inner housing wall.

2. The sealing system of claim 1, wherein the second sealing element comprises a labyrinth seal configured to guide radial float of the first sealing element and the second sealing element.

3. The sealing system of claim 2, wherein a radially outward surface of the first sealing element is in contact with a radially inward surface of an axial extension of the labyrinth seal.

4. The sealing system of claim 1, comprising a guide ring circumferentially disposed around the first sealing element and the second sealing element, wherein the first sealing element comprises a first lip seal, and the second sealing element comprises a second lip seal.

5. The sealing system of claim 4, wherein the guide ring enables the first sealing element and the second sealing element to radially float around the rotor shaft.

6. The sealing system of claim 1, comprising a third sealing element configured to be circumferentially disposed around the rotor shaft, wherein the first sealing element comprises a first lip seal, the second sealing element comprises a labyrinth seal, and the third sealing element comprises a second lip seal, wherein the labyrinth seal is configured to guide radial float of the first sealing element, the second sealing element, and the third sealing element.

7. The sealing system of claim 6, wherein the second sealing element is axially between the first sealing element and the third sealing element.

8. The sealing system of claim 1, wherein the first sealing element and the second sealing element comprise a modular assembly configured to be installed within a cavity of a motor housing.

9. The sealing system of claim 1, comprising an anti-rotation pin coupled between the first sealing element and the second sealing element to block rotation of the first sealing element and the second sealing element relative to one another.

10. The sealing system of claim 1, wherein the first sealing element and the second sealing element are configured to be disposed around the rotor shaft axially adjacent to a bearing assembly of the motor, and wherein the sealing system is configured to maintain oil of the bearing assembly within the bearing assembly.

11. The sealing system of claim 1, wherein the second sealing element defines an aperture extending radially through the second sealing element to receive the pressurized fluid from a compressor.

12. A sealing system for a motor of a compressor, comprising:
a first sealing element configured to be circumferentially disposed around a rotor shaft of the motor within an annular chamber of a motor housing;
a second sealing element configured to be circumferentially disposed around the rotor shaft within the annular chamber, wherein the first sealing element and the second sealing element are configured to radially float around the rotor shaft; and
a spring element disposed axially between the first sealing element and the second sealing element, wherein the spring element is configured to bias the first sealing element against a first wall of the annular chamber to adjust an axial position of the first sealing element and the second sealing element within the annular chamber.

13. The sealing system of claim 12, wherein a sealing tip of the first sealing element is configured to lift from a surface of the rotor shaft in response to a pressurized fluid directed between the first sealing element and the second sealing element.

14. The sealing system of claim 12, wherein the first sealing element comprises a lip seal, and the second sealing element comprises a labyrinth seal, and wherein the labyrinth seal is configured to guide radial float of the first sealing element and the second sealing element relative to the rotor shaft.

15. The sealing system of claim 12, comprising a guide ring configured to be circumferentially disposed around the rotor shaft within the annular chamber and circumferentially surrounding the first sealing element and the second sealing element, wherein the guide ring is configured to guide radial float of the first sealing element and the second sealing element, and wherein the first sealing element comprises a first lip seal and the second sealing element comprises a second lip seal.

16. A motor for a compressor, comprising:
a housing;
a rotor shaft extending within the housing;
a first sealing element circumferentially disposed around the rotor shaft;
a second sealing element comprising a labyrinth seal circumferentially disposed around the rotor shaft, wherein a sealing tip of the first sealing element is configured to lift from a surface of the rotor shaft in response to a pressurized fluid directed between the first sealing element and the second sealing element, and wherein the labyrinth seal is configured to enable the first sealing element and the second sealing element to radially float around the rotor shaft; and
a spring element disposed axially between the first sealing element and the second sealing element, wherein the spring element is configured to bias the first sealing element against a first wall of an annular chamber of the housing to adjust an axial position of the first sealing element and the second sealing element within the annular chamber.

17. The motor of claim 16, comprising a guide ring circumferentially surrounding the first sealing element and the second sealing element, wherein the guide ring is configured to enable the first sealing element and the second sealing element to radially float around the rotor shaft.

18. The motor of claim 16, wherein an inner surface of the housing and an outer surface of the rotor shaft at least partially define the annular chamber therebetween, and wherein the first sealing element and the second sealing element are disposed within the annular chamber.

19. The motor of claim 16, comprising a third sealing element circumferentially disposed around the rotor shaft, wherein the first sealing element comprises a first lip seal, and the third sealing element comprises a second lip seal, wherein the labyrinth seal is coupled to the first lip seal and the second lip seal and is configured to guide radial float of the first lip seal and the second lip seal.

20. The motor of claim 19, comprising a second spring element disposed axially between the second sealing element and the third sealing element, wherein the second spring element is configured to bias the third sealing element against a second wall of the annular chamber.

* * * * *